Oct. 13, 1936. W. S. PRITCHARD Re. 20,130

TAPE PULLER

Original Filed April 7, 1928

Wm. S. Pritchard
INVENTOR

Reissued Oct. 13, 1936 Re. 20,130

UNITED STATES PATENT OFFICE 20,130

TAPE PULLER

William S. Pritchard, Mount Vernon, N. Y., assignor to Trans-Lux Daylight Picture Screen Corporation, New York, N. Y., a corporation of Delaware Original No. 1,861,582, dated June 7, 1932, Serial No. 268,162, April 7, 1928. Application for reissue November 9, 1935, Serial No. 49,041

9 Claims. (Cl. 178—42)

This invention relates to an apparatus for feeding tape and more particularly to an apparatus for feeding or pulling tape intermittently ejected from a data-recording machine through a projection system.

Apparatus has been devised whereby the tape ejected from a data-recording device may be fed across a table or other support from which images of the data on the tape may be obtained upon a screen. The apparatus heretofore used included a feeding or pulling means controlled by the tension in the tape. I have found that I am able to obtain a satisfactory feeding of the tape and a satisfactory projection by controlling the feed mechanism independently of the tape and through the data-recording device.

Therefore, it is an object of this invention to provide a tape feeding mechanism adapted to be used in a data-recording-projection-system controlled by the data-recording means and independent of the tape.

A further object of this invention is to provide a tape feeding mechanism including means to increase the speed of the feeding mechanism when the tape has not been taken up or fed through the apparatus as rapidly as delivered, said feeding mechanism being controlled through the data-recording device.

A further object of this invention is to provide a tape feeding mechanism controlled by the data-recording device through a switch-like mechanism which does not operate said feeding mechanism until a predetermined loop of tape is formed.

Further objects will appear from the following description, appended claims and the accompanying drawing in which:

Figure 1:
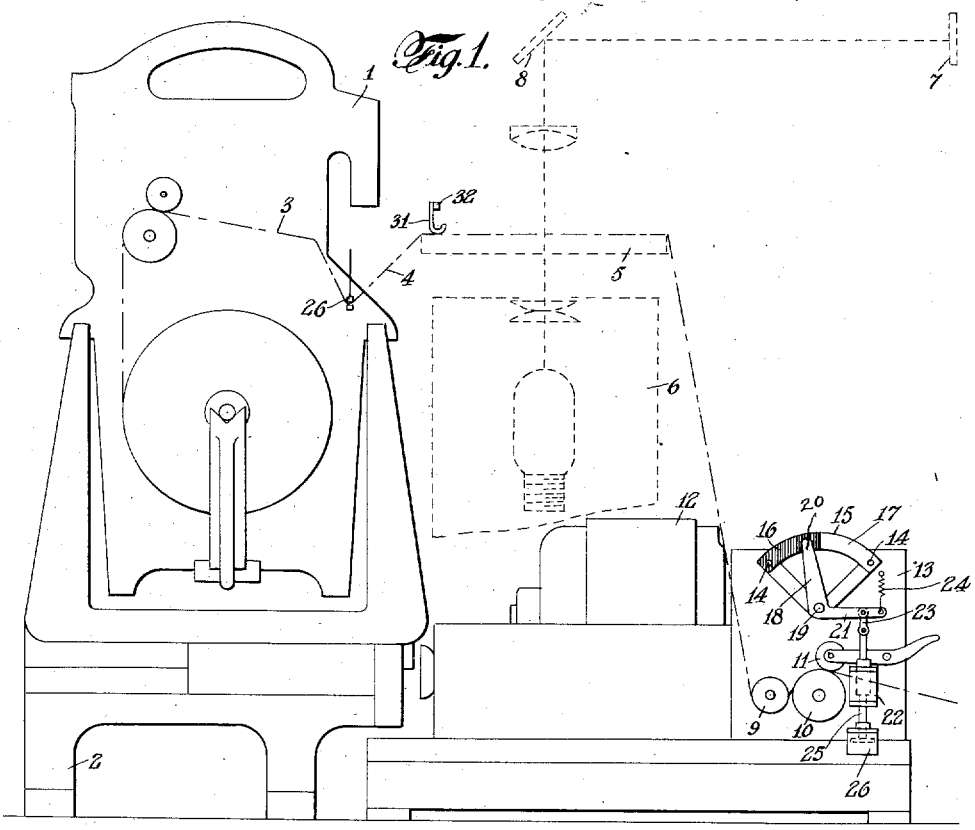
Figure 1 is a side elevation of an apparatus embodying my invention and showing the data-recording device and the projection system diagrammatically.

Referring to the drawing in which like reference numerals designate like parts, the reference numeral 1 designates a data-recording device mounted on a suitable base 2. This data-recording device may be the standard Western Union ticker and, since the details thereof do not form an essential part of this invention, further description thereof is here deemed unnecessary.

A tape 3 printed in the data-recording device is intermittently ejected therefrom, forming a loop 4. The ejected tape 3 is pulled or fed by means of a feed mechanism across a transparent support, such as a glass table 5. When in position on the support, images of the data or other indicia on the tape are obtained, by means of a projection system 6, on a screen 7. If necessary, mirrors or reflectors 8 may be used to transmit or direct the rays or beams of light into proper position. The details of the projection system, since they, too, do not form an essential part of this invention, are not here described.

The feeding mechanism which draws the tape from the loop 4 adjacent the ticker across the projection table comprises a guide roll 9, a feeding or pulling roll 10 and a pressure roll 11 mounted in cooperative relation with said pulling roll. The pulling roll 10 may have a knurled periphery and is connected to a motor 12 through a worm and gear (not shown), whereby the motion of the motor 12 is transmitted to the pulling roll 10.

Mounted at any suitable place on the machine, and preferably on the gear casing 13 by means of screws 14, is a contact or switch element 15 having an insulated portion 16 and conductive portion 17. A bell-crank lever 18 is pivotally mounted on a pin 19 so that one arm 20 thereof is normally in contact with the insulated portion 16 of the contact element. The other arm 21 of the bell-crank lever 18 is mounted adjacent a solenoid 22 of the plunger type and connected thereto through a link 23 for reasons hereinafter explained. As stated above, the arm 20 of the bell-crank lever 18 is normally in position on the insulated portion of said segment. This may be accomplished by connecting the end of the arm 21 to a spring 24 which will continually urge it upward. It, however, may be made to assume this position by various other means. For instance, the center of gravity of the bell-crank lever may be made to be at such a point that it will normally tend to keep the arm in position on the insulated portion. The plunger 25 of the solenoid 22 is attached to a dash pot 26 of any well-known construction and its function will become apparent from the operation of the machine given hereinafter.

On the loop of tape 4, there rides a spring contact member 27 which, when the loop has increased to a predetermined size, separates from another spring contact member 28 and opens the shunt field circuit 29a of the motor, whereby the speed of said motor is increased. An adjustable resistance 29 may be connected across the shunt field circuit 29a.

Figure 2:
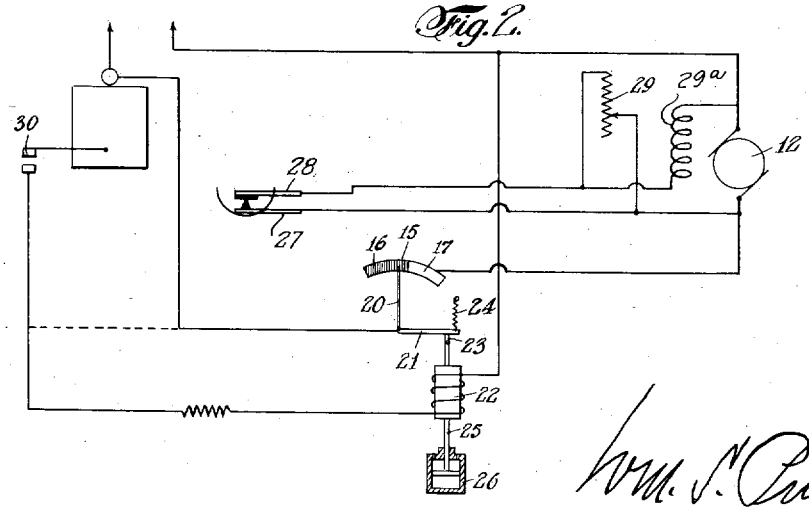
Figure 2 is a wiring diagram showing the connection of the parts illustrating the operation of the device.

In the operation of the machine, the ticker 1, as it prints and ejects the tape therefrom, through its press arm 30, makes and breaks a circuit including the solenoid 22. These impulses cause the plunger 25 in the solenoid to move downward, attracting and pulling with it the arm 21 of the bell-crank lever 18. Due to the arrangement of the arms, the arm 20 is caused to advance across the insulated portion 16 on to the conductive portion 17 of the contact element. When the arm 20 is on the conducting portion 17, a circuit is closed (see Figure 2), and the motor operated whereby its motion is transmitted to the tape pulling or feeding roll.

The insulated portion 16 is made of such a size that it requires several impulses to advance the arm 20 to the conductive portion 17. Since the motor mechanism is not operating during these impulses, the tape ejected from the ticker forms the loop 4. In other words, the mechanism forms a loop prior to starting the operation of the pulling mechanism.

If, during the operation, the tape is ejected from the ticker faster than it is taken up or pulled through the apparatus, the loop 4 increases in size and, accordingly, the contact 27 separates from the contact 28, whereby the shunt field circuit of the motor is opened. This causes the motor to speed up and the pulling or feeding mechanism to operate faster. This circuit remains open so long as the loop switch is open. When the loop has become shortened or smaller in size, the contacts 27 and 28 reengage thereby closing the shunt field motor circuit and allowing the motor to run at its usual and normal rate of speed. The resistance 29 inserted in the motor field circuit is an adjustable one and by adjusting it the increase of the speed of the motor may be manually controlled at will.

In operation, if the ticker should stop operating and the circuit opened, the spring 23 pulling upward on the arm 21 of the bell-crank lever would tend to move the arm 20 from the conducting portion 17 to the insulated portion 16. This movement, however, is greatly retarded by the action of the dash pot 26 to which one end of the plunger 25 of the solenoid 22 is attached. Due to this construction, the rate of movement of the arm 20 is so adjusted that the loop formed prior to the operation of the motor mechanism is drawn out as the arm is urged to its normal position on the insulation.

To prevent the intermittent jerky motion of the tape as it leaves the ticker from being transmitted to the tape on the table, I may dispose a tension device adjacent the end of the table next the ticker so as to maintain the tape resiliently in contact therewith. This tension device is exemplified by a curved or J-shaped spring 31 supported by a bracket 32 and acting as a brake on the tape by contacting therewith. The J-spring 31 may contact with any portion of the tape, but I prefer to have it contact with the tape at its middle portion. The braking action of this member is sufficient to prevent the tape from being pushed along the table by the same force which ejects it from the ticker, but is insufficient to prevent the tape from being pulled along the table by the motor mechanism.

I do not limit myself to the exact details of construction above described except as defined in the claims, since it will be obvious to any one skilled in the art that various modifications may be made without departing from the nature of the invention. For instance, instead of having the circuit through the switch and the motor operating continuously, it may be formed through the ticker press arm and operate the motor in synchronism with the ticker. Also various switch and contact elements different from the one herein specifically described may be used and various means may be used to maintain the arm 20 on the insulation 16.

Ordinarily, when practicing my invention, the tape is drawn through a projection field or projection system. It shall be understood, however, that my invention is not to be thus limited since, as well, the tape may be drawn along a path so arranged that said tape may be directly viewed. Therefore, in the appended claims, the term "projection system" shall be understood as generically comprehending a projection field, observation region, or the like.

I claim:

1. In combination, a data-recording device adapted to eject a tape therefrom, a tape pulling mechanism for feeding said ejected tape through a projection system, said mechanism comprising a pulling roll, means for rotating said roll, said means including a motor mechanism, means having conductive and non-conductive portions, a bell-crank lever, said bell-crank lever having one arm normally in contact with the non-conductive means, and a solenoid operating on the other arm of said lever and controlled by the data-recording device, whereby the first-mentioned arm will be advanced on to the conductive portion and the motor operated.

2. In combination, a ticker adapted to eject a tape therefrom, a tape pulling mechanism for feeding said tape through a projection system, said mechanism comprising a pulling roll, means for rotating said roll, said means including a motor mechanism, means having conductive and non-conductive portions, a bell-crank lever, said bell-crank lever having one arm normally in contact with the non-conductive portion, a solenoid operating on the other arm of said lever and controlled by the ticker mechanism, whereby the first-mentioned arm will be advanced on to the conductive portion and the motor operated, and means to increase the speed of the motor.

3. In combination, a ticker adapted to eject a tape therefrom, a tape pulling mechanism for feeding said tape through a projection system, said mechanism comprising a pulling roll, means for rotating said roll, said means including a motor mechanism, means having conductive and non-conductive portions, a bell crank lever, said bell-crank lever having one arm normally in contact with the non-conductive means, a solenoid operating on the other arm of said lever and controlled by the ticker mechanism, whereby the first-mentioned arm will be advanced on to the conductive portion and the motor operated, and means to increase the speed of the motor, said last named means being controlled by the tape being fed.

4. In combination, a ticker adapted to eject a tape therefrom, and means for feeding said tape through a projection system, said feeding means comprising a motor mechanism, a switch element having conductive and non-conductive portions, a bell-crank lever, a spring for normally maintaining one arm of said bell-crank lever in contact with said non-conductive portion, a solenoid of the plunger type controlled by said ticker, said plunger connected at one end to the other arm of said lever, whereby the first-mentioned arm will be advanced on to the conductive portion and the motor operated when the ticker operates, and means for retarding the action of said spring when the ticker stops operating.

5. In combination, a ticker adapted to eject a tape therefrom, means for feeding said tape through a projection system, said feeding means comprising a motor mechanism, a switch element having conductive and non-conductive portions, a bell-crank lever, a spring for normally maintaining one arm of said bell-crank lever in contact with said non-conductive portion, a solenoid of the plunger type controlled by said ticker, said plunger connected at one end to the other arm of said lever, whereby the first-mentioned arm will be advanced on to the conductive portion and the motor operated when the ticker operates, and a dash pot connected to the other end of said plunger whereby the action of said spring will be retarded when the ticker stops operating.

6. In combination, a ticker adapted to eject a tape therefrom, means for feeding said tape through a projection system, said feeding means comprising a motor mechanism, a switch element having conductive and non-conductive portions, a bell-crank lever, a spring for normally maintaining one arm of said bell-crank lever in contact with said non-conductive portion, a solenoid of the plunger type controlled by said ticker, said plunger connected at one end to the other arm of said lever, whereby the first-mentioned arm will be advanced on to the conductive portion and the motor operated when the ticker operates, means for retarding the action of said spring when the ticker stops operating, and means to increase the speed of the motor mechanism, said last named means being controlled by the tape.

7. The combination with a device for printing characters on a tape, of a motor operating substantially at constant speed for moving said tape through a projection field, and means for substantially increasing the operating speed of said motor, said means being operated in response to the accumulation of tape between said device and said projection field.

8. The combination with a device for printing characters on a tape, of a motor operating substantially at constant speed for moving said tape through a projection field, and means for substantially increasing the operating speed of said motor, said means comprising a member riding on a loop formed in the tape between said device and said projection field.

9. The combination with a device for printing characters on a tape, of a motor operating substantially at constant speed for moving said tape through a projection field, and means for substantially increasing the operating speed of said motor, said means comprising a member riding on a loop formed in the tape between said device and said projection field, said means comprising a device operated in response to accumulation of tape between said device and said projection field and upon lowering of said member to thereby increase the speed of said motor.

WM. S. PRITCHARD.